Nov. 5, 1946.  R. B. HITCHCOCK ET AL  2,410,500
FEEDER FOR THRESHERS
Filed Aug. 21, 1944  2 Sheets-Sheet 1

Inventors:
R. B. Hitchcock and
H. S. Seeber
By: Paul O. Pippel
Atty.

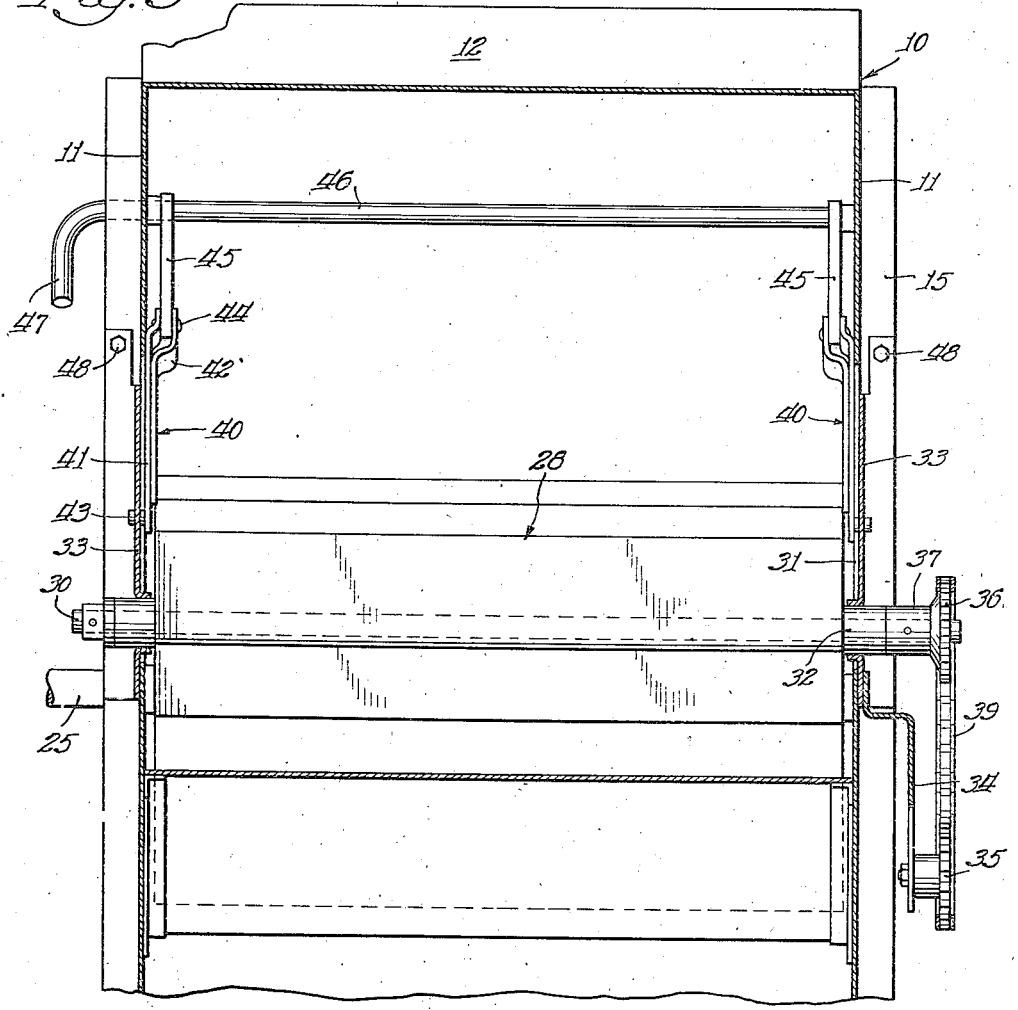
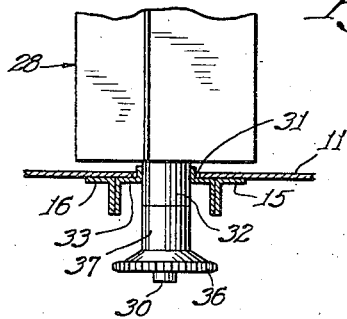

Patented Nov. 5, 1946

2,410,500

UNITED STATES PATENT OFFICE 2,410,500

FEEDER FOR THRESHERS

Rex B. Hitchcock, Evanston, and Harold S. Seeber, Moline, Ill., assignors to International Harvester Company, a corporation of New Jersey Application August 21, 1944, Serial No. 550,464

4 Claims. (Cl. 130—27)

This invention relates to a threshing device. More specifically it relates to a feeding means adjustable to gain access to a threshing cylinder.

In the operation of threshing machines, particularly those of the traveling harvester thresher type, clogging is often encountered due to heavy growth of weeds and other material which is carried from the harvester part with the grain into the threshing cylinder. It is, therefore, desirable to provide means for readily gaining access to the threshing cylinder for inspection and for removing material which has, or is, apt to clog the threshing cylinder or prevent its efficient operation. The present invention has to do with the provision of means whereby an operator may readily gain access to the threshing cylinder without removing permanent cover plates or disconnecting any drive mechanisms.

The principal object of the invention is to mount a feeding device for a threshing mechanism which can be vertically moved to gain access to the threshing cylinder.

Another object is to provide a driving mechanism which permits raising of a feeding means without disconnecting the driving mechanism.

Another principal object is to provide a manually operable linkage which will lift a feeding means out of operative position and hold the mechanism, due to the inherent construction of the linkage, until it has manually returned to operating position.

The above objects and others concerned with the positioning of the drive mechanism and the construction of the adjusting linkage will be apparent from the detailed description to follow.

In the drawings:

Figure 3 is a section taken on the line 3—3 of Figure 1; and

Figure 4 is a section taken on the line 4—4 of Figure 2.

Figure 1:
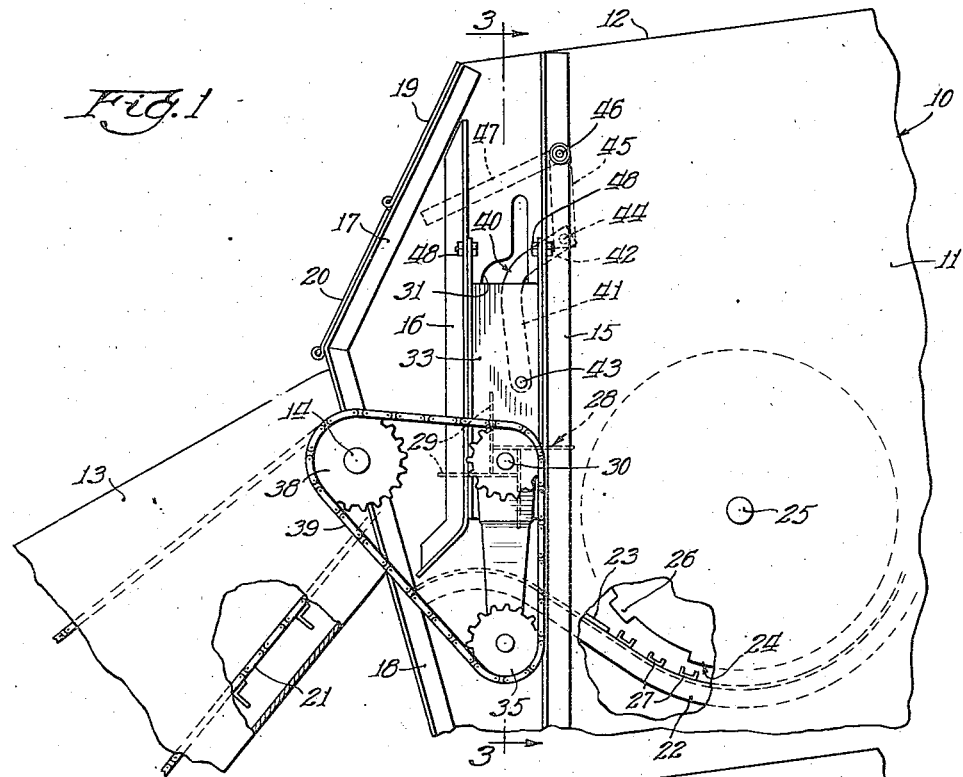
Figure 1 is a side elevation view of a portion of a harvester thresher showing the rear end of the harvester part with its conveying mechanism and the forward end of the thresher body with its threshing cylinder.

A large portion of the grain in this country is now harvested by traveling machines called harvester threshers or combines, the grain being cut and conveyed to a thresher mechanism and threshed all in one operation. The drawings show such portions of a harvester thresher as are necesssary to properly illustrate the feed mechanism and its adjustment of the invention. The harvester thresher includes a thresher body 10 having side walls 11 and a top wall 12. The front end of the thresher body is opened to provide for the delivery of grain thereto from a harvester part 13, which is pivoted at 14 on the side walls 11. A portion of a frame structure for the body part 10 is shown. Said frame structure includes vertical upright angle bars 15 and 16, spaced from each other, and angle bars 17 and 18 extending along the forward extremities of the side walls 11. It will be noted that the angle bars 17 and 18 are arranged at an angle with respect to each other, both bars sloping rearwardly from the center. The upper part of the opening at the front of the thresher body is closed by a wall 19. A hinged cover 20 extends downwardly from the wall 19 substantially to the upper part of the harvester part 13. The broken away portion of Figure 1 shows a conveyor 21 which carries the cut grain upwardly and into the forward open-end of the harvester body 11. Curved angle bars 22, as shown in the broken away portion of Figure 1 and in dotted lines beyond the broken away portion, support a feed plate 23 over which the material discharged from the conveyor 21 is delivered to a thresher cylinder 24, supported by the side walls 11 of the thresher body and carried by a shaft 25 which is shown projecting through one side wall in Figure 1. The thresher cylinder carries the usual thresher elements in the form of rub bars 26, said bars cooperating with a concave structure including concave elements 27, as shown in the broken away portion of Figure 1.

Figure 2:
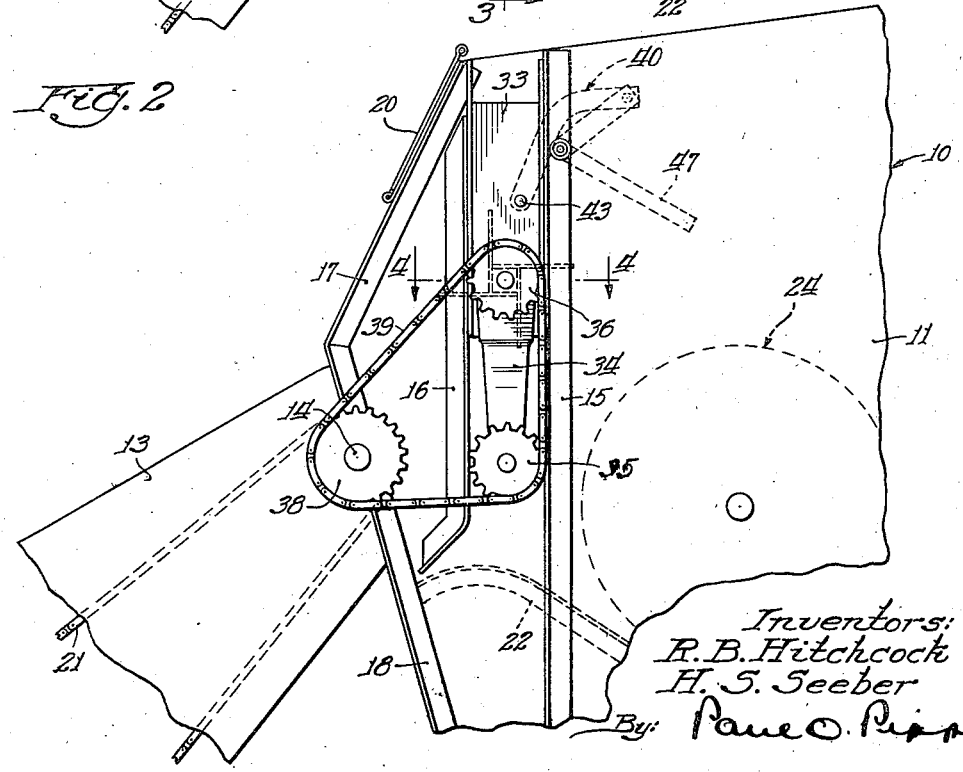
Figure 2 is a view similar to Figure 1 showing the feeding mechanism, which embodies the invention, lifted to a position which provides access to the threshing cylinder.

To assist in delivering material from the conveyor 21 to the thresher cylinder 24, a rotating feed member is usually provided. Said member may take the form of a feed beater 28 having a plurality of feeding elements 29 extending tangentially therefrom, circumferentially spaced. Said elements engage the material and move it over the plate 23 into engagement with the threshing cylinder. The feed beater 28 is carried by a shaft 30 which extends through slots 31 formed in the side walls 11 of the thresher body. Said shaft at each end is provided with a cylindrical sleeve 32 which forms a journal for the shaft. Each sleeve 32 is carried by a supporting member 33 channel-shaped in cross-section. The over-all width of the member 33 is such that it slidably fits between the channels 15 and 16, permitting vertical sliding movement of the supporting members with respect to the thresher body. The slots 31 are of such length as to permit the feed beater to be raised to the height as shown in Figure 2, which gives ample room for gaining access to the threshing cylinder when the cover 20 is lifted to the position shown in Figure 2.

A bracket 34, connected to the lower end of one of the members 33, extends outwardly and downwardly to provide a support for an idler pulley 35. The idler pulley 35, in the illustration shown, is in the form of a sprocket and is in alinement with a drive pulley or sprocket 36 which is provided with a hub 37 keyed to the shaft 30 for rotation therewith. A drive pulley 38 mounted on the axis 14 on which the harvester part is pivoted provides means for driving the feed beater through the pulley 36. The pulley 38 is journaled on a portion of the thresher body for rotation about a fixed axis. Said pulley may be a part of other drive mechanism and power may be supplied thereto by any conventional means. A drive chain 39 surrounds the pulleys or sprockets 35, 36, and 38. Other drive mechanism such as a V-belt could be used on grooved pulleys, as the load on the feed beater is not such as to require a heavy positive drive mechanism. It will be noted that the pulley 35 lies vertically beneath the pulley 36 and that the pulley 38 lies horizontally in alinement with the pulley 35, when the feed beater is raised, and horizontally in alinement with the pulley 36 when the feed beater is lowered.

A link 40, having a substantially vertical portion 41 and a rearwardly inclined portion 42, is pivotally connected at 43 to each of the supporting members 33. Each of said links is pivotally connected by a pin 44 to an arm 45, said arms being rigidly secured to a transverse shaft 46 extending across the thresher body. One end of the shaft 46 extends beyond the thresher body, being provided with an operating extension 47 which may be grasped by an operator for oscillating the shaft 46, thereby oscillating the lifting arms 45 from their positions as shown in Figure 1 to the positions as shown in Figure 2. The feed beater and its supporting member 33 are lifted by this operation. It will be noted that the pivot axes 43 of the links 40, on the members 33 with respect to the pivot pins 44 and the axis of the shaft 46, is such that, due to the curved nature of the links, an over-center position is attained as shown in Figure 2, thereby holding the feed beater in raised position until the operating extension 47 is moved upwardly to lower the feed beater.

The arrangement of the sprockets, as previously described in detail, is such that the length of the surrounding chain is not greatly altered during the lifting of the feed beater. This removes the necessity of providing a resiliently mounted idler or a disconnecting drive chain during the lifting of the feed beater.

The operation of applicants' improved feed beater supporting and lifting structure and means for holding the beater in adjusted position has been explained in connection with the description of the component parts thereof.

As shown in Figure 1, bolts 48, passing through alined openings in the angle bars 15 and 16 and in channel sides of the members 33, hold the members securely in position when the feed beater is in operating position. These bolts are removed when it is desired to lift the beater for access to the threshing cylinder.

It will be understood that applicants claim as their invention all modifications falling within the scope of the appended claims.

What is claimed is:

1. In a harvesting machine having a thresher body and a harvester part pivotally connected thereto, said thresher body having an open-end, side walls and a thresher cylinder supported by the side walls adjacent the open-end, and said harvester part having conveyor means for feeding material through said open-end of the thresher body to said cylinder, a rotatable feeding structure positioned between the conveyor means and the cylinder, vertical slidable supporting means for the ends of said feeding structure mounted on the side walls of the thresher body, linkage for lifting the feeding structure and the supporting means therefor, said linkage including an over-center mechanism for maintaining the feeding structure in elevated position until released, an idler pulley carried by the slidable supporting means spaced from the axis to the feeding structure, a drive pulley carried by the feeding structure, a power input drive pulley carried on the thresher body, said pulleys being arranged with the drive pulley on the feeding structure and the idler pulley on the feeding structure supporting means lying in substantially vertical alinement and said drive pulley being spaced laterally from the other pulleys and being substantially horizontal with the feeding structure pulley when the feeding structure is in operating position and being substantially horizontal with respect to the idler pulley when the feeding structure is in raised position, said arrangement of pulleys providing a chain path of substantially the same length during all positions of adjustment of the feeding structure, and a drive chain passing over said pulleys.

2. In a harvesting machine having a thresher body and a harvester part pivotally connected thereto, said thresher body having an open-end, side walls and a thresher cylinder supported by the side walls adjacent the open-end, and said harvester part having conveyor means for feeding material through said open-end of the thresher body to said cylinder, a rotatable feeding structure positioned between the conveyor means and the cylinder, vertical slidable supporting means for the ends of said feeding structure mounted on the side walls of the thresher body, linkage for lifting the feeding structure and the supporting means therefor, an idler pulley carried by the slidable supporting means spaced from the axis to the feeding structure, a drive pulley carried by the feeding structure, a power input drive pulley carried on the thresher body, said pulleys being arranged with the drive pulley on the feeding structure and the idler pulley on the feeding structure supporting means lying in substantially vertical alinement and said drive pulley being spaced laterally from the other pulleys and being substantially horizontal with the feeding structure pulley when the feeding structure is in operating position and being substantially horizontal with respect to the idler pulley when the feeding structure is in raised position, said arrangement of pulleys providing a chain path of substantially the same length during all positions of adjustment of the feeding structure, and a drive chain passing over said pulleys.

3. In a harvesting machine having a thresher body and a harvester part pivotally connected thereto, said thresher body having an open-end, side walls and a thresher cylinder supported by the side walls adjacent the open-end, and said harvester part having conveyor means for feeding material through said open-end of the thresher body to said cylinder, a rotatable feeding structure positioned between the conveyor means and the cylinder, vertical slidable supporting means for the ends of said feeding structure mounted on the side walls of the thresher body, and linkage for lifting the feeding structure and the supporting means therefor, said linkage including a transverse shaft rotatably carried by the side walls above the feeding structure, lifting arms extending from the shaft, links connecting said arms with the vertical slidable supporting means, and means to rotate the shaft.

4. In a harvesting machine having a thresher body and a harvester part pivotally connected thereto, said thresher body having an open-end, side walls and a thresher cylinder supported by the side walls adjacent the open-end, and said harvester part having conveyor means for feeding material through said open-end of the thresher body to said cylinder, a rotatable feeding structure positioned between the conveyor means and the cylinder, vertical slidable supporting means for the ends of said feeding structure mounted on the side walls of the thresher body, and linkage for lifting the feeding structure and the supporting means therefor, said linkage including a transverse shaft rotatably carried by the side walls above the feeding structure, lifting arms extending from the shaft, curved links connecting said arms with the vertical slidable supporting means, and means to rotate the shaft until the curved links are moved into an over-center position with respect to the shaft.

REX B. HITCHCOCK.
HAROLD S. SEEBER.